3,625,709
Patented Dec. 7, 1971

3,625,709
ACETALDEHYDE CARBOHYDRATE COMPLEX
William A. Mitchell, Lincoln Park, N.J., assignor to General Foods Corporation, White Plains, N.Y.
No Drawing. Filed Feb. 18, 1969, Ser. No. 800,246
Int. Cl. A23l 1/22, 1/26
U.S. Cl. 99—140 R  11 Claims

ABSTRACT OF THE DISCLOSURE

Formation of an acetaldehyde-carbohydrate composition is effected with a chloride salt catalyst. The resulting material has excellent room temperature stability over wide ranges of ambient humidities and has application as a food flavoring and aroma enhancer.

BACKGROUND OF THE INVENTION

(1) Field of the invention

This invention relates to food flavoring and aroma enhancers and more particularly to food flavoring and aroma enhancers consisting of acetaldehyde combined with carbohydrates to form compositions which are stable under normal shelf storage conditions but which release acetaldehyde when combined with hot water or with cold water.

(2) Description of the prior art

Acetaldehyde is a minor but important component of many flavors, especially of the natural fruit flavors and the beneficial effect of improving the flavor and aroma of certain foods, especially those containing slightly acidic fruit flavoring ingredients, by fortifying the food with small amounts of additional acetaldehyde is well known. It is, however, only within the recent past (cf. Dame et al. U.S. Pat. No. 3,314,803) that the enhancement of the flavor of prepared food mixes, such as a dry gelatin dessert mix in powdered form, by the incorporation of additional acetaldehyde could be realized with any degree of commercial practicality.

Acetaldehyde is chemically very reactive; it is very soluble in water; and it has a low boiling point (21° C.) and therefore is very volatile at room temperature. It is, furthermore, readily oxidized to form acetic acid. Thus, the problem confronting the food industry in augmenting the flavor and aroma of dry powdered mixes has been that of "fixing" acetaldehyde in a sufficiently stable state to avoid solubilization, volatilization, and/or chemical reaction leading to decomposition and loss during storage and also, to limit the degree of fixation to permit the release of the acetaldehyde compound during the normal household use procedure of rehydrating or otherwise preparing a finished table product from the powdered mix by the addition of either hot or cold water.

Heretofore, it has been a problem to fix the acetaldehyde to the extent the "chemical bonds" are strong enough to prevent decomposition while the fixed acetaldehyde, incorporated in a food product, is stored in conventional paper-type packaging on the retailer's shelf, but are sufficiently limited in strength to permit the release of the acetaldehyde from its fixed state when the mix is being converted to a finished product through the usual household preparatory steps of hot or cold water addition.

Generally speaking, there are two methods of "fixing" acetaldehyde to insure improvement in shelf stability. One method is to chemically react the acetaldehyde with another material to form a more stable compound. The second method is to physically entrap or coat the acetaldehyde with a stable compound such as a sugar, gum or other edible material.

With respect to the first method—that of forming a more stable compound—the resulting composition must not only have a degree of stability compatible with storage and subsequent use conditions but it must also be a functional derivative type compound i.e., it must have an inherent chemical structure which will release acetaldehyde upon decomposition. Also the residual decomposition compound other than the acetaldehyde resulting from the breakdown of the functional derivative compound must not be detrimental to the quality of the finished food product.

Although many attempts have been made to produce suitable functional derivative compounds by reacting acetaldehyde with other chemical compounds, with few exceptions, they have not resulted in operational successes. The major causes of the failures have been instability of the resulting product or, conversely, too great a stability to provide utility.

The usual procedure in attempting to combine acetaldehyde chemically with another compound is to form an ethylidene compound as the reaction product. This, in itself, is very difficult in that polymerization and/or ring compound formation is difficult to avoid because of the high chemical reactivity of acetaldehyde. The resulting ring compound or polymerized reaction product is very stable and is, therefore, not of value for decomposing to form acetaldehyde for food flavoring and aroma enhancement.

Kremers (U.S. Pat. No. 2,305,621) discloses the formation of functional derivative compounds from the reactions involving carbonyl and hydroxyl groups. These functional derivatives are chemical compounds different from the original reaction materials—they are not mixtures of the reactants and are characterized by having specific melting points. Although many examples are provided in the Kremers' patent, the formation of acetaldehyde-carbohydrate hemi-acetals is not included. The reaction products described in the Kremers' patent have individual flavoring characteristics and are, in general, used for the specific flavor characteristic of the resulting compound. In other words, the products of the reactions described are too stable to decompose during the usual household preparatory steps of adding either hot or cold water and when employed are used as flavoring compounds per se.

Kremers (U.S. Pat. No. 2,305,620) describes the preparation of a reaction product of acetaldehyde and urea. Although it is stated to be useful for imparting freshness to a variety of fruit flavors, its utility is diminished because of the relatively large amounts of urea introduced into the foods to be flavored with the compound.

My co-pending application (Ser. No. 657,770, now abandoned) relates to an improvement over the Kremers' 620 invention in that the inventive step involves the fixation of acetaldehyde by chemical reaction with urea under such conditions that a molar 1:1 reaction product, ethylol urea is formed. The conditions of operation are such as to prevent side reactions including the formation of ethylol diurea described in Kremers' patent, and polymerization products. Ethylol urea finds utility in enhancing the flavor of fruit drinks, particularly those in which the pH is slightly acid. Since it dissolves easily in cold, acidic water, liberating acetaldehyde and leaving a tolerable small amount of urea in contrast to the ethyloldiurea reaction products of the Kremers' invention, it is a much preferred functional derivative compound. Ethylol urea, however, is not soluble in cold water unless the water is acidic but is, however, soluble in hot water.

Dame et al., disclosed in U.S. Pat. No. 3,314,803 a method of "fixing" acetaldehyde by encapsulating the acetaldehyde in a matrix of dried mannitol. This procedure has produced a successful flavor enhancing material for powdered fruit mixes but has the disadvantage of being very costly because of the current price of mannitol.

As set forth in a copending application (Ser. No. 657,531, now U.S. Pat. No. 3,554,768) assigned to the assignee of this patent application, a process is described for encapsulating acetaldehyde in carbohydrates not containing free amine groups viz. dextrins, sugars and partially hydrolyzed starch such as corn syrup solids. The present invention is an improvement over that disclosed in the copending application (Ser. No. 657,531).

SUMMARY OF THE INVENTION

It is a general object of this invention to provide a stable acetaldehyde containing composition which is capable of being admixed with powdered fruit flavored mixes and which, upon the addition of hot or cold water during the preparation of the mix for table use, enhance the flavor and aroma of the prepared food product.

It is a specific object of this invention to produce a dry nonhydroscopic, pulverant acetaldehyde containing composition which is stable when held at elevated temperatures (70° F.–90° F.) and high relative humidities. Stability is maintained even though the humidity conditions are sufficiently extreme to cause surface wetting of the acetaldehyde containing composition.

It is another specific object of this invention to provide an acetaldehyde containing composition with a clean, pleasant acetaldehyde taste.

It is still another object of this invention to provide an acetaldehyde composition when used to enhance the flavor of dry, powdered food mixes does not leave any residual chemical compound which has a detrimental flavor.

It is another object of this invention to provide an acetaldehyde containing component which has an acetaldehyde content of 1.5 to 10% on a dry weight basis.

It is still another object of this invention to provide an acetaldehyde containing component which when admixed with dry pulverent food mixes will readily release acetaldehyde when hot or cold water is added to the mixture.

The involved invention, in accomplishing the foregoing objects, is concerned with a process of preparing an acetaldehyde-carbohydrate chemical complex.

The invention is based on the discovery that ammonium chloride and other salts have the ability to catalyze the reaction of acetaldehyde and certain carbohydrates to shift the equilibrium of the reaction sufficiently to produce a physico-chemical complex type composition which has a decomposition pattern intermediate to that of a physically encapsulated combination of acetaldehyde with carbohydrate and that of a pure chemical reaction product.

I have discovered that it is only chloride salt catalysts which will cause the chemical reaction between the acetaldehyde and the carbohydrate to proceed to the desired degree of completion. Salts other than chloride salts may catalyze the reaction to a limited extent but not to the desirable degree obtained with the chloride salts. Without the use of any catalyst there is little, if any, chemical reaction between the acetaldehyde and the carbohydrate and the resulting product representing a "fixed" acetaldehyde composition loses the acetaldehyde component quite readily when exposed to high humidity conditions. On the other hand, when a catalyst such as hydrochloric acid is used the reaction is very difficult to control and proceeds quite rapidly to produce polymerized and/or ethylidene type products. The latter two classes of products do not release acetaldehyde when admixed with either hot or cold water.

The application of this discovery makes possible the formation of a dry pulverent material which, when mixed with a powdered fruit-flavored composition can be stored indefinitely in ordinary paper packaging at usual room temperature conditions without appreciable decomposition. Conversely, the discovery also provides for an acetaldehyde-carbohydrate complex which, unlike an ethylidene type product or polymerized chemical reaction product readily releases acetaldehyde when dissolved in warm water or in very slightly acidulated cold water.

In accordance with the objects of this invention, the carbohydrate is dissolved or dispersed in hot water to the extent of approximately 50% by weight and is then cooled to about 20° C. before the catalyst is added to the aqueous solution, acetaldehyde is added to a chilled carbohydrate matrix having a solids content of about 50% in the presence of a catalyst. The mixture is rapidly cooled to below the temperature at which it solidifies and preferably below the freezing temperature. It is then dried by any of the conventional drying methods and sub-divided into powder form.

A wide range of carbohydrate materials is suitable for purposes of this invention. Lactose, sucrose, glucose, partially hydrolyzed starches such as corn syrup solids, dextrins, and pectin are illustrative of the carbohydrates which can be employed. It is however, essential that carbohydrate derivatives with free amine groups such as glucose amine not be used because of the chemical affinity of the amine group to acetaldehyde to chemically react and form a very stable reaction product which, under the intended use conditions for the products of this invention, is too stable to release the desired acetaldehyde.

According to the invention, acid or neutral chloride salts are employed as catalysts in concentrations of approximately 0.1–1% based on the dry weight of the carbohydrate. Ammonium chloride, calcium chloride, and sodium chloride are representative of the preferred catalyst embodiments. Concentrations of catalyst above 0.5% of the dry weight of carbohydrate are unnecessary and, in fact, less desirable since a portion of the acetaldehyde in these reactions may be so strongly bound chemically, possibly by acetal or ethylene formation, that it is not hydrolyzed subsequently and is not available for flavor and aroma enhancement purposes in the food product.

The acetaldehyde is added in the gaseous state by bubbling it into the aqueous carbohydrate-catalyst dispersion with suitable reflux or by adding it as a liquid to the chilled carbohydrate-catalyst suspension and uniformly blending the mixture. Optimum acetaldehyde addition is attained when it is added to the extent of about 50% by weight of the carbohydrate solids present.

The catalyzed chemical reaction proceeds to equilibrium very rapidly and, immediately upon the completion of uniform mixing, the aqueous suspension of acetaldehyde-carbohydrate complex can be chilled further to the solid state and dehydrated.

The exact nature of the chemical reaction is not known. It is believed that the catalyst promotes the reaction of a portion of the acetaldehyde with the carbohydrate to the extent of forming hemi-acetal reaction products and a second portion of the acetaldehyde is physically entrapped in the carbohydrate. The relative amounts of acetaldehyde entering into the two different combinations with the carbohydrate has not been determined. What has been found to be unexpected and is a feature of novelty of this invention is the superior storage stability of the resulting composition when compared with the product made by combining acetaldehyde with a carbohydrate without the catalyst being present.

The solidified acetaldehyde-carbohydrate product can be dried by vacuum oven or by freeze drying. Alternatively, the acetaldehyde-carbohydrate product may be maintained at liquefying temperature and spray dried. In general, the materials which are dehydrated by vacuum oven or freeze drying are found to be more stable than similar samples which are spray dried. From the standpoint of storage stability, vacuum oven drying appears to be equally effective as freeze drying as a method for dehydrating the acetaldehyde-carbohydrate product.

The dehydrated catalyzed acetaldehyde-carbohydrate composition will have an initial fixation of 2–14% by weight of acetaldehyde. After holding the material for about a four day "stabilization" period the acetaldehyde content will stabilize at about 80% of the initial fixed amount, usually in the range of 1.5–10%. More importantly, however, when incorporated in a dry powdered beverage or dessert mix at optimum flavor enhancement levels corresponding to acetaldehyde contents of 0.005–0.015% of the weight of the mix, the catalyzed acetaldehyde-carbohydrate composition has excellent storage stability and is superior in this respect to the non-catalyzed acetaldehyde-carbohydrate composition.

The invention may be practiced in its preferred embodiments as illustrated in the following examples and subsequent discussion thereon. Where parts and percentages are used in this specification and claims, they are parts and percentages by weight unless otherwise designated.

EXAMPLE 1

Eightly grams of lactose were dissolved in 120 grams of hot water containing 0.32 gram of ammonium chloride. The solution was cooled to 25° C. and 20 grams of liquid acetaldehyde added and uniformly blended. The resulting composition was frozen and then freeze dried. The freeze dried material was powdered and samples of the powder were packaged in paper-type packets pervious to ambient temperature and humidity conditions and stored for 21 days at 90° F. and 85% relative humidity.

A second sample of material was prepared under the same conditions except the ammonium chloride catalyst was omitted. The second sample was packaged in a manner similar to the first and stored under identical conditions.

Analysis of the acetaldehyde content of both the stored materials are shown in Table I.

TABLE I

Acetaldehyde Content of Catalyzed Acetaldehyde-Lactose Composition Compared with Control under Similar Storage Condition

| Sample | 0 days (percent) | 21 days (percent) |
|---|---|---|
| Acetaldehyde plus lactose plus NH₄Cl | 14.4 | 8.0 |
| Acetaldehyde plus lactose (no catalyst) | 15.4 | 0.74 |

From the above table it can be seen that the catalyzed acetaldehyde-lactose composition retained a considerable amount of acetaldehyde after 21 days storage even though the conditions were sufficiently severe to wet the material whereas the control sample lost almost all of its acetaldehyde.

EXAMPLE 2

Twenty grams of corn syrup solids (24DE) were dissolved in 40 ml. of hot water and the solution was then cooled to 20° C. A solution of ammonium chloride catalyst (0.08 gram in 5 ml. of water) was then added to the corn syrup solution, after which 10 grams of liquid acetaldehyde was added and uniformly mixed. The acetaldehyde-carbohydrate composition was then frozen and freeze dried. The freeze dried material was then ground with a mortar and pestle to pass through a 30 mesh screen and packaged in pervious paper-type packets.

A second sample of acetaldehyde-corn syrup solids (24DE) material was prepared and packaged by the same techniques except the ammonium chloride catalyst was not included. Samples of each of the acetaldehyde-corn syrup solids compositions were added to a dry powdered beverage mix corresponding to an acetaldehyde level of 0.01% by weight. The beverage mixes were packaged in screw cap glass containers and stored at 90° F. and 85% R.H. Each container was opened daily for one minute and a spoonful of the mix was removed. Samples of the mixes were analyzed for acetaldehyde content after two and four weeks storage. The results of the analysis are shown in Table II.

TABLE II

Retention of Acetaldehyde in Beverage Mixes Stored at 90° F./85% R.H.

| | 14 days storage (percent)* | 28 days storage (percent) |
|---|---|---|
| Beverage mix plus (acetaldehyde-corn syrup solids plus catalyst) | 67 | 28 |
| Beverage mix plus (acetaldehyde-corn syrup solids) | 28 | 12 |

* Percentage of the original amount of acetaldehyde remaining in the beverage mix.

It is apparent from the above data that the uncatalyzed acetaldehyde-corn syrup solids composition lost acetaldehyde at about twice the rate of the catalyzed combination under actual "use" conditions and subjected to a severe storage climate.

EXAMPLE 3

Three samples of acetaldehyde-lactose composition were prepared in which a different chloride salt catalyst was used in the preparation of each sample. The three samples were then compared with an acetaldehyde-lactose composition prepared without the use of a catalyst. Each of the four samples was prepared by admixing 20 grams of lactose with 30 grams of hot water and cooling the solutions to 10° C. To the first sample was added 0.08 gram of NH₄Cl; to the second, 0.08 gram of CaCl₂; to the third, 0.08 gram of NaCl, and to the fourth, no catalyst. Five grams of liquid acetaldehyde were uniformly blended into each sample and the four samples were frozen and freeze dried under the same conditions. The freeze-dried samples were ground to pass through a 30 mesh screen.

The acetaldehyde content of each sample was measured and an aliquot of each sample incorporated into four similar dry powdered beverage mixes to provide each sample of mix with an acetaldehyde content of 0.01%. The four samples were packaged in screw top jars and stored and tested for acetaldehyde content as described in Example 2. Test results are shown in Table III.

TABLE III

Effect of Different Chloride Salt Catalysts on the Stability of Acetaldehyde-Lactose Incorporated as a Flavor Enhancer in a Dry Beverage Mix

[Retention (percent) of original acetaldhyde added to beverage mix (as acetaldehyde -lactose)]

| | Storage at 90° F./ 85% R.H. | |
|---|---|---|
| | 2 weeks | 4 weeks |
| Catalyst: | | |
| NH₄Cl | 81 | 42 |
| CaCl₂ | 62 | 39 |
| NaCl | 70 | 32 |
| None | 32 | 6 |

At catalyst concentration of 0.4% of the carbohydrate weight, the best stability was obtained wherein ammonium chloride was used as the catalyst in the preparation of the acetaldehyde-lactose composition. However, sodium chloride and calcium chloride catalysts also provided an acetaldehyde-lactose composition with appreciably better storage stability under actual use conditions than the acetaldehyde-lactose composition prepared without a catalyst.

EXAMPLE 4

Three samples of acetaldehyde-lactose were prepared in which a different level of ammonium chloride catalyst was used in the preparation of each sample. The three samples were then compared with a fourth sample of acetaldehyde-lactose prepared without the use of a catalyst. Each of the four samples was prepared by admixing 20 grams of lactose with 30 grams of hot water and cooling the solutions to 10° C. To the first sample was added 0.08 gram of NH₄Cl; to the second 0.8 gram of NH₄Cl; and to the third 1.6 grams of NH₄Cl. No catalyst was added to the fourth sample.

Five grams of liquid acetaldehyde were uniformly blended into each sample and the four samples were frozen and freeze dried under the same conditions. The freeze dried samples were ground to pass through a 30 mesh screen.

An aliquot of each sample was added to a similar amount of a dry powdered beverage mix at a concentration level corresponding to an acetaldehyde content of 0.01% by weight of the individual portion of each dry powdered beverage mix. The beverage mixes were packaged in screw cap glass containers and stored at 90° F. and 85% R.H. Each container was opened daily for one minute and a spoonful of mix was removed. Samples of the mixes were analyzed for acetaldehyde content after two and four weeks storage. The results of the analysis are shown in Table IV.

TABLE IV

Effect of $NH_4Cl$ Catalyst Level on Stability of Acetaldehyde-Lactose Incorporated as a Flavor Enhancer in a Dry Beverage Mix

[Retention (percent) of original acetaldehyde added to beverage mix (as acetaldehyde-lactose)]

| Catalyst concentration [1] | Storage at 90° F./ 85% R.H. | |
|---|---|---|
| | 2 weeks | 4 weeks |
| 0 | 32 | 6 |
| 0.4 | 81 | 42 |
| 4.0 | 76 | 24 |
| 8.0 | 58 | 2 |

[1] Percent of carbohydrate weight.

As can be seen in Table IV, the best stability was obtained with a catalyst level of 0.4% of the carbohydrate weight. Higher levels of ammonium chloride catalyst used with the acetaldehyde-lactose system do not enhance, but rather impair the stability of the resulting physico-chemical product.

EXAMPLE 5

The beverage mixes of Example No. 3, after 4 weeks of storage at 90° F. and 85% relative humidity, were tested for solubility in both warm and cold water.

A heaping teaspoon of each beverage mix was added to a glass (6 fl. oz.) of water at 80° F. and rapidly spoon stirred. Each of the beverage mixes dissolved within 10 seconds in the warm water to produce pleasantly aromatic beverages with no detectable salty taste or other unpleasant flavor.

The tests were repeated using 6 fluid ounces of tap water at approximately 50° F. to dissolve a heaping teaspoon of each of the beverage mixes. Each of the mixes dissolved upon rapid spoon stirring with 15 seconds to produce pleasant tasting beverages with no detectable salty taste or other unpleasant flavor.

What is claimed is:

1. A process for preparing a flavor enhancing composition comprising:
   (a) mixing water with acetaldehyde, a catalyst which is effective to cause complexing of acetaldehyde with carbohydrate, and a carbohydrate selected from the group consisting of hydrophilic colloids not having free amine groups, water dispersible dextrins, partial-hydrolyzed starches, sugars and mixtures of any of these; and
   (b) drying the catalyzed aqueous carbohydrate-acetaldehyde mixture whereby the acetaldehyde is complexed with the carbohydrate.

2. A process according to claim 1 wherein the carbohydrate is a sugar selected from the group consisting of lactose, sucrose, maltose, and mixtures of any of these.

3. A process according to claim 1 wherein the carbohydrate is partially hydrolyzed starches.

4. A process according to claim 1 wherein the catalyst is a chloride salt selected from the group consisting of acid chloride salts and neutral chloride salts.

5. A process according to claim 4 wherein the drying method is freeze drying.

6. A process for preparing a dry flavor enhancing composition comprising:
   (a) dissolving lactose in water;
   (b) adding a catalyst selected from the group consisting of acid chloride salts and neutral chloride salts to the lactose solution;
   (c) chilling the lactose solution;
   (d) adding acetaldehyde to the chilled lactose solution;
   (e) freezing the lactose-acetaldehyde solution; and
   (f) freeze drying the frozen lactose-acetaldehyde solution whereby the acetaldehyde is complexed with the lactose.

7. A process according to claim 6 wherein the catalyst is a chloride salt selected from the group consisting of ammonium chloride, sodium chloride and calcium chloride.

8. A process for preparing a dry flavor enhancing composition comprising:
   (a) dissolving corn syrup solids in water;
   (b) adding ammonium chloride catalyst to the corn syrup solids solution;
   (c) chilling the corn syrup solids solution;
   (d) adding acetaldehyde to the chilled corn syrup solids solution;
   (e) freezing the acetaldehyde corn syrup solids solution; and
   (f) freeze drying the frozen acetaldehyde-corn syrup solids solution whereby the acetaldehyde is complexed with the corn syrup solids.

9. A process according to claim 4 wherein the drying method is vacuum oven drying.

10. A process according to claim 4 wherein the catalyst is employed in concentrations of about 0.1% to 1% based on the dry weight of the carbohydrate.

11. A process according to claim 10 wherein the concentration of the catalyst not above 0.5% of the dry weight of the carbohydrate.

References Cited

UNITED STATES PATENTS 2,856,291  10/1958  Schultz _____ 99—140
3,482,988  12/1969  Kaleda _____ 99—140 X MORRIS O. WOLK, Primary Examiner W. BOVEE, Assistant Examiner U.S. Cl. X.R.

99—78; 260—209, 233.3